(12) United States Patent
Neelakantan et al.

(10) Patent No.: US 10,464,094 B2
(45) Date of Patent: Nov. 5, 2019

(54) PRESSURE INDUCED SURFACE WETTING FOR ENHANCED SPREADING AND CONTROLLED FILAMENT SIZE

(71) Applicant: PALO ALTO RESEARCH CENTER INCORPORATED, Palo Alto, CA (US)

(72) Inventors: Ravi Neelakantan, Redwood City, CA (US); Elif Karatay, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 212 days.

(21) Appl. No.: 15/665,048

(22) Filed: Jul. 31, 2017

(65) Prior Publication Data

US 2019/0030559 A1   Jan. 31, 2019

(51) Int. Cl.
*B05B 17/04* (2006.01)
*B05B 9/03* (2006.01)
(Continued)

(52) U.S. Cl.
CPC ............... *B05B 17/04* (2013.01); *B05B 1/02* (2013.01); *B05B 3/02* (2013.01); *B05B 9/03* (2013.01);
(Continued)

(58) Field of Classification Search
CPC . Y10T 29/4956; Y10T 29/49561; B05B 3/10; B05B 3/1007; B05B 3/1021; B05B 3/1071; B05B 3/1078
(Continued)

(56) References Cited

U.S. PATENT DOCUMENTS 2,291,046 A   7/1942   Lange
3,406,660 A   10/1968  Simm
(Continued)

FOREIGN PATENT DOCUMENTS

EP   2227834   8/2011

OTHER PUBLICATIONS

Bhat, Pradeep P., "Formation of beads-on-a-string structures during break-up of viscoelastic filaments," Aug. 2010, vol. 6:625-631, Nature Physics, 7 pages.
(Continued)

*Primary Examiner* — Jason L Vaughan
(74) *Attorney, Agent, or Firm* — Miller Nash Graham & Dunn LLP

(57) ABSTRACT

A roller includes a cylindrical outer surface of a hydrophobic material, an inner core of a hydrophilic material, and an inhomogeneous geometric pattern of grooves in the surface that expose the hydrophilic material. A method of manufacturing a roller, includes providing a cylindrical core of a hydrophilic material, covering the cylindrical core with a hydrophobic surface, creating grooves in the hydrophobic surface to form a geometrically inhomogeneous pattern of the hydrophilic material. A method of manufacturing a roller, includes forming a pattern of geometrically inhomogeneous grooves on a hydrophobic core, functionalizing the surface to make the surface hydrophilic, and removing a portion of a top layer of the hydrophobic core to expose the hydrophobic core, leaving hydrophilic grooves.

17 Claims, 7 Drawing Sheets

Figure 1:
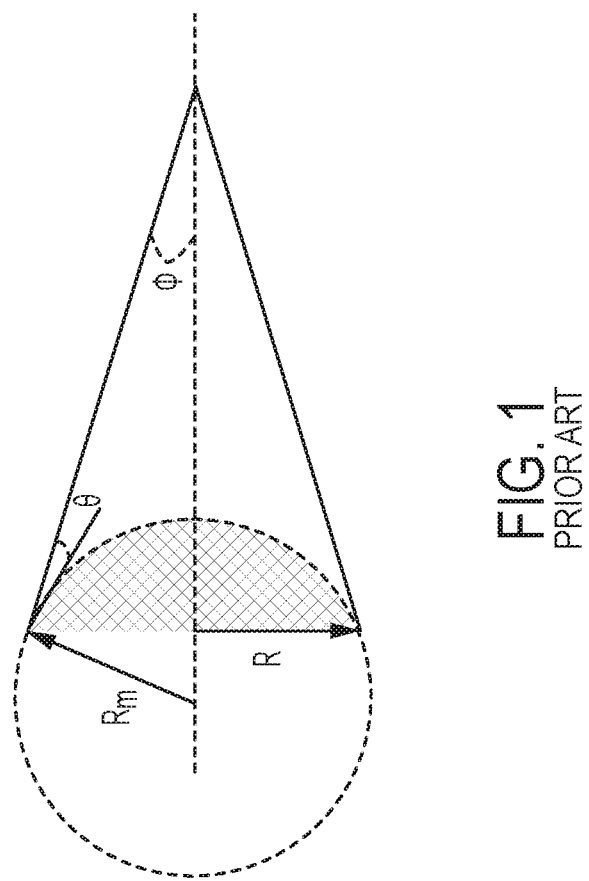

(51) Int. Cl.
*B05B 1/02* (2006.01)
*B29D 99/00* (2010.01)
*B05B 3/02* (2006.01)
*B29K 79/00* (2006.01)

(52) U.S. Cl.
CPC .... *B29D 99/0035* (2013.01); *B29K 2079/085* (2013.01); *Y10T 29/49561* (2015.01)

(58) Field of Classification Search
USPC ........................................ 492/30, 33, 34, 35
See application file for complete search history.

(56) References Cited

U.S. PATENT DOCUMENTS

| | | | |
|---|---|---|---|
| 3,554,815 A | 1/1971 | Otto | |
| 3,626,833 A | 12/1971 | Koch | |
| 3,649,829 A | 3/1972 | Randolph | |
| 2,296,861 A | 9/1972 | Albert | |
| 3,702,258 A | 11/1972 | Gibbons et al. | |
| 3,717,875 A | 2/1973 | Arciprete et al. | |
| 3,873,025 A | 3/1975 | Qvarnstrom | |
| 3,926,114 A | 12/1975 | Matuschke | |
| 3,988,986 A | 11/1976 | Zimmer | |
| 4,011,993 A | 3/1977 | Mizuno et al. | |
| 4,034,670 A | 7/1977 | Zavodny | |
| 4,046,931 A | 9/1977 | Innes et al. | |
| 4,222,059 A | 9/1980 | Crean et al. | |
| 4,332,281 A | 6/1982 | Baba | |
| 4,384,296 A | 5/1983 | Torpey | |
| 4,860,652 A * | 8/1989 | Kawata | B41N 7/06 101/348 |
| 4,993,320 A * | 2/1991 | Kochsmeier | B41N 7/06 101/148 |
| 5,022,948 A | 6/1991 | Hallworth | |
| 5,123,350 A * | 6/1992 | Fadner | B41N 7/06 101/348 |
| 5,127,325 A * | 7/1992 | Fadner | B41N 7/06 101/348 |
| 5,191,703 A * | 3/1993 | John | B41N 7/06 29/895.32 |
| 5,207,158 A * | 5/1993 | Fadner | B41N 7/06 101/348 |
| 5,216,952 A | 6/1993 | Hoff et al. | |
| 5,270,086 A | 12/1993 | Hamlin | |
| 5,314,119 A | 5/1994 | Watt | |
| 5,326,598 A | 7/1994 | Seaver et al. | |
| 5,332,472 A | 7/1994 | Cutright et al. | |
| 5,835,114 A | 11/1998 | Nagata et al. | |
| 6,033,513 A | 3/2000 | Nakamura | |
| 6,125,756 A | 10/2000 | Nussel et al. | |
| 6,382,524 B1 | 5/2002 | James | |
| 6,576,861 B2 | 6/2003 | Sampath et al. | |
| 6,622,335 B1 | 9/2003 | Anderson et al. | |
| 6,934,142 B2 | 8/2005 | Grosse et al. | |
| 7,083,830 B2 | 8/2006 | Minko | |
| RE40,722 E | 6/2009 | Chappa | |
| 7,837,307 B2 | 11/2010 | Schmitt | |
| 8,132,744 B2 | 3/2012 | King et al. | |
| 8,272,579 B2 | 9/2012 | King et al. | |
| 8,273,286 B2 | 9/2012 | Fram | |
| 8,511,251 B2 | 8/2013 | Sato | |
| 8,522,711 B2 | 9/2013 | McNeil et al. | |
| 8,523,340 B2 | 9/2013 | Sabo et al. | |
| 8,552,299 B2 | 10/2013 | Rogers et al. | |
| 8,720,370 B2 | 5/2014 | Rebstock | |
| 8,742,246 B2 | 6/2014 | Toyoda et al. | |
| 9,021,948 B2 | 5/2015 | Pattekar | |
| 2001/0011511 A1 | 8/2001 | Kawabata et al. | |
| 2002/0053320 A1 | 5/2002 | Duthaler et al. | |
| 2003/0183099 A1 | 10/2003 | De Vroome | |
| 2003/0222950 A1 | 12/2003 | Jeanmaire | |
| 2004/0020382 A1 | 2/2004 | McLean et al. | |
| 2004/0079282 A1 | 4/2004 | Sano et al. | |
| 2004/0217184 A1 | 11/2004 | Seidel | |
| 2005/0000231 A1 | 1/2005 | Lee | |
| 2005/0250900 A1 | 11/2005 | Stofko | |
| 2006/0035033 A1 | 2/2006 | Tanahashi et al. | |
| 2006/0071978 A1 | 4/2006 | Steiner et al. | |
| 2009/0011212 A1 | 1/2009 | Dubey | |
| 2009/0014046 A1 | 1/2009 | Yu et al. | |
| 2009/0032492 A1 | 2/2009 | Kunze-Concewitz | |
| 2009/0153627 A1 | 6/2009 | Barbet | |
| 2010/0064917 A1 | 3/2010 | Blanchard et al. | |
| 2010/0154856 A1 | 6/2010 | Yuichi et al. | |
| 2011/0011289 A1 | 1/2011 | Bohm et al. | |
| 2011/0017431 A1 | 1/2011 | Yang et al. | |
| 2011/0031100 A1 * | 2/2011 | Qtaishat | B01D 61/364 202/205 |
| 2011/0150036 A1 | 6/2011 | Lee et al. | |
| 2011/0154558 A1 | 6/2011 | Peter et al. | |
| 2011/0220147 A1 | 9/2011 | Schreiber et al. | |
| 2012/0103213 A1 | 5/2012 | Stowe et al. | |
| 2012/0145019 A1 | 6/2012 | Cheng et al. | |
| 2012/0145021 A1 | 6/2012 | Pfeil | |
| 2012/0227778 A1 | 9/2012 | Leonov | |
| 2013/0070031 A1 | 3/2013 | Nelson | |
| 2013/0087180 A1 | 4/2013 | Stark et al. | |
| 2014/0015901 A1 | 1/2014 | Marcus | |
| 2014/0146116 A1 | 5/2014 | Paschkewitz | |
| 2015/0115057 A1 | 4/2015 | Beck et al. | |
| 2015/0119477 A1 | 4/2015 | Beck et al. | |
| 2015/0343407 A1 | 12/2015 | Johnson et al. | |
| 2015/0343468 A1 | 12/2015 | Johnson et al. | |
| 2015/0343477 A1 | 12/2015 | Johnson et al. | |
| 2017/0203504 A1 | 7/2017 | Johnson et al. | |

OTHER PUBLICATIONS

Le, Hue P., "Progress and Trends in Ink-jet Printing Technology," Jan./Feb. 1998, vol. 42:49-62, Journal of Imaging Science and Technology, 16 pages, found at: http://www.imaging.org/ist/resources/tutorials/inkjet.cfm.

Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.

Owen, M., "Misting of non-Newtonian Liquids in Forward Roll Coating," Jul. 13, 2011, Journal of Non-Newtonian Fluid Mechanics, vol. 166:1123-1128, 6 pages.

Shi, X.D., "A Cascade of Structure in a Drop Falling from a Faucet," Jul. 8, 2004, vol. 265:219-222, Science, 4 pages.

Chapter 15, "Ink Jet Printing", 14 pages, found at http://www.lintech.org/comp-per/15INK.pdf.

Marple, A. and Liu, Y.H.: "Characteristics of Laminar Jet Impactors", Environmental Science & Technology, vol. 8, No. 7, Jul. 1974, pp. 648-654.

Bailey, Adrian G.: "The Science and technology of electrostatic powder spraying, transport and coating", Journal of Electrostatics, vol. 45, 1998, pp. 85-120.

Domnick, et al.: "The Simulation of Electrostatic Spray Painting Process with High-Speed Rotary Bell Atomizers. Part II: External Charging", Part. Part. Syst. Charact. vol. 23, 2006, pp. 408-416, URL: http://www.ppsc-journal.com.

Kelly, Ryan T, et al.: "The ion funnel: theory, implementations, and applications", Mass Spectrometry Reviews,vol. 29, 2010, pp. 294-312.

Crowe, Clayton et al.: "Multiphase Flows With Droplets and Particles", CRC Press, LLC, 1998.

McClure, Max, "Stanford Researchers' Cooling Glove Better than Steroids—and Helps Solve Physiological Mystery Too", Stanford Report, Aug. 29, 2012, 3 pages, retrieved from the Internet: http://news.stanford.edu/news/2012/august/cooling-glove-research-082912.html, retrieved on Dec. 19, 2014.

Matheson, Rob, "Cool Invention Wins First Place at MADMEC", MIT News Office, Oct. 17, 2013, 3 pages, retrieved from the Internet: http://newsoffice.mit.edu/2013/madmec-design-competition-1017, retrieved on Dec. 19, 2014.

(56) References Cited

OTHER PUBLICATIONS

Vanhemert, Kyle, "MIT Wristband Could Make AC Obsolete", Wired.com, Oct. 30, 2013, retrieved from the Internet: http://www.wired.com/2013/10/an-ingenious-wristband-that-keeps-your-body-at-theperfect-temperature-no-ac-required/, retrieved on Dec. 19, 2014.
Francioso, L., "Flexible thermoelectric generator for ambient assisted living wearable biometric sensors", Journal of Power Sources, vol. 196, Issue 6, Mar. 15, 2011, pp. 3239-3243.
http://www.stacoolvest.com/, retrieved on Dec. 19, 2014.
http://www.steelevest.com/, retrieved on Dec. 19, 2014.
http://veskimo.com/, retrieved on Dec. 19, 2014.
http://glaciertek.com/, retrieved on Dec. 19, 2014.
Chen, A., "Dispenser-printed planar thick-film thermoelectric energy generators," J. Micromech. Microeng., 21(10), 2011.
Hewitt, A.B., "Multilayered Carbon Nanotube/Polymer Composite Based Thermoelectric Fabrics," Nano Letters, 12(3), pp. 1307-1310, 2012.
Arens, E., "Partial- and whole-body thermal sensation and comfort—Part I: Uniform environmental conditions," Journal of Thermal Biology, vol. 31, Issues 1-2, Jan. 2006, pp. 53-59.
Arens, E., "Partial- and whole-body thermal sensation and comfort—Part II: Non-uniform environmental conditions," Journal of Thermal Biology, vol. 31, Issues 1-2, Jan. 2006, pp. 60-66.
Bullis, Kevin, "Expandable Silicon", MIT Technology Review, Dec. 14, 2007, URL: http://www.technologyreview.com/news/409198/expandable-silicon/, retrieved from the Internet on Dec. 23, 2014.
"Ortho-Planar Spring", BYI Mechanical Engineering Website, URL: http://compliantmechanisms.byu.edu/content/ortho-planar-spring, retrieved from the Internet on Dec. 23, 2014.
S.-J. Kim, J.-H. Wea and B.-J. Cho: "A wearable thermoelectric generator fabricated on a glass fabric," Energy Environmental Science, 2014.
L. Francioso, C. De Pascali, A. Taurino, P. Siciliano, A. De Risi: "Wearable and flexible thermoelectric generator with enhanced package," In Proc. SPIE 8763, Smart Sensors, Actuators, and MEMS VI, 876306, May 2013.
C. Huizenga, H. Zhang, E. Arens, D. Wang: "Skin and core temperature response to partial-and whole-body heating and cooling," Journal of Thermal Biology, vol. 29, Issues 7-8, Oct.-Dec. 2004, pp. 549-558.
Sholin, V. et al.: "High Work Function Materials for Source/Drain Contacts in Printed Polymer Thin Transistors," Applied Physics Letters, vol. 92, 2008.
Zhou, Li, et al.: "Highly Conductive, Flexible, Polyurethane-Based Adhesives for Flexible and Printed Electronics," Advanced Functional Materials, vol. 23, p. 1459-1465, wileyonlinelibrary.com.

\* cited by examiner

PRESSURE INDUCED SURFACE WETTING FOR ENHANCED SPREADING AND CONTROLLED FILAMENT SIZE

RELATED APPLICATIONS

This application is related to the following US applications and patents:

US Patent Publication No. US2015011947, "Method of Creating an Aerosol by Stretching Filaments Between Two Diverging Surfaces,";

US Patent Publication No. US20150343477, "System for Creating Aerosols by Stretching Filaments,";

US Patent Publication No. US20150115057, "System for Creating Aerosols by Stretching Filaments,";

US Patent Publication No. US20150210009, "Spray Deposition System,";

US Patent Publication No. US20150343468, "System for Creating Aerosols by Stretching Filaments,";

U.S. Pat. No. 9,257,056, "System for Creating Aerosols by Stretching Filaments,";

US Patent Publication No. 20160175856, "Spray Deposition System,";

U.S. patent application Ser. No. 14/575,922, "System for Creating Aerosols by Stretching Filaments,";

U.S. patent application Ser. No. 15/001,408, "System Using Aerosol Generation and Selective Charging,";

U.S. patent application Ser. No. 15/001,452, "Method Using Aerosol Generation and Selective Charging,"; and U.S. patent application Ser. No. 15/651,195, "Central Fed Roller for Filament Extension Atomizer,".

TECHNICAL FIELD

This disclosure relates to filament extension atomizer systems, more particularly to rollers used in these systems.

BACKGROUND

Palo Alto Research Center, Inc. ("PARC") has developed a filament extension atomizer system that generates aerosols from liquids. The system generally involves stretching a liquid filament between two diverging surfaces until the filament breaks up into a spray of droplets. In some versions of the system, the fluid input to the system involves doctor blades and the pressure formed between the two surfaces. In one version, the two surfaces are rollers and the rollers form a nip between them to distribute the fluid.

Typically, for most fluids this is very effective. However, for fluids with relatively high surface tension, and therefore having large contact angles on a flat and smooth surface, spreading the fluid uniformly in a controlled manner on rapidly moving surfaces becomes problematic. The spreading can typically be enhanced by using more hydrophilic materials, such as plastics with polar monomers or metal oxides, which lower the contact angle. Although even this approach often fails to generate ideal surface wetting for generating a consistent spray from high surface tension fluids.

SUMMARY

An embodiment consists of a roller including a cylindrical outer surface of a hydrophobic material, an inner core of a hydrophilic material, and an inhomogeneous geometric pattern of grooves in the surface that expose the hydrophilic material.

An embodiment consists of a method of manufacturing a roller including providing a cylindrical core of a hydrophilic material, covering the cylindrical core with a hydrophobic surface, creating grooves in the hydrophobic surface to form a geometrically inhomogeneous pattern of the hydrophilic material.

An embodiment consists of a method of manufacturing a roller including forming a pattern of geometrically inhomogeneous grooves on a hydrophobic core, functionalizing the surface to make the surface hydrophilic, and removing a portion of a top layer of the hydrophobic core to expose the hydrophobic core, leaving hydrophilic grooves.

BRIEF DESCRIPTION OF THE DRAWINGS

FIG. 1 shows a diagram of radii involved in the development of a roller.

FIG. 2 shows an embodiment of a filament extension atomizer system.

FIG. 3 shows an embodiment of a pair of counter rotating rollers in which one is a roller with a helical groove.

FIG. 4 shows a diagram of a grooved roller.

FIG. 5-7 show different embodiments of grooved rollers.

FIGS. 8-9 show surface profile measurements for different roller embodiments.

DETAILED DESCRIPTION OF THE EMBODIMENTS

As mentioned previously, issues arise with higher surface tension liquids because they do not spread easily over most commercially available machinable materials, such as metals and thermoplastics. High surface tension fluids, particularly surfactant-free aqueous mixtures, tend to coalesce rather than spread and the contact angles of these fluids may surpass 90°. Thus, manipulating the film thickness becomes increasingly difficult as surface tension increases. Applying pressure to the surface of the roller with a doctoring blade results in fluid being trapped between the roller and blade, and eventually being expelled to the sides. When the interaction energy between the fluid and surface is favorable, film thickness is modified by altering the flow rate from the feed with the doctoring blade in contact. The fluid adheres to roller surface and can pass through the doctoring blade because of the lower contact angle.

The use of high surface energy plastic rollers provides lower contact angles, but is often insufficient to spread the fluid with a doctor blade. Embodiments here rely on capillary pressure by using patterned grooves on the surface, which generates strong fluid adhesion in discrete, hydrophilic, regions of the roller. Varying the groove dimensions also allows control of the filament size which will ultimately affect the size of the droplets in the spray. The fluids can be strictly confined to the grooves by coating the ridges with a hydrophobic material, and having them separated by ridges less than three times the size of the grooves. This effectively narrows the droplet size distribution by generating filaments in discrete sizes.

These rollers are fabricated by using a hydrophilic core such as polyetherimide, and in some embodiments may involve coating it with a hydrophobic material such as PTFE, Teflon, etc., only a few microns thick. The channels are then created using a turn finish of a desired radius, $R_a$, depending on desired filament size. The capillary pressure in the channels spontaneously draws fluid into them, while the hydrophobic ridges repel fluid into the hydrophilic channels. The capillary pressure is calculated using the Laplace equation:

$$\Delta P = \sigma \left( \frac{1}{R_1} + \frac{1}{R_2} \right)$$

where $R_1$ and $R_2$ are the radii of curvature of the surface and $\sigma$ is the surface tension.

$$R_1 = R_m = \frac{R}{\cos(\theta + \vartheta)}.$$

$R_m$ is substituted for $R_1$ which is shown in FIG. 1. The angle $\theta$ is the contact angle of the fluid on the surface, and $\vartheta$ is the angle bisecting the capillary. For situations where $R_2 \gg R_1$, the term $1/R_2$ is omitted, which gives rise to:

$$\Delta P = \frac{\cos(\theta + \vartheta)}{R}$$

Figure 2:
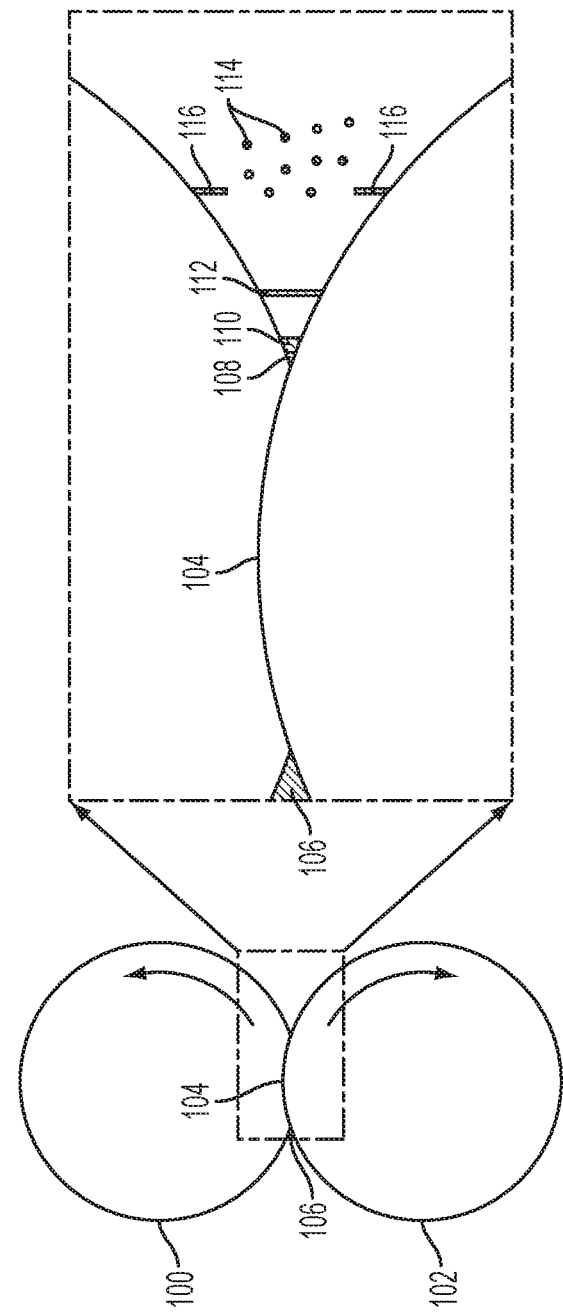

FIG. 2 shows a filament extension atomizer system. Two counter rotating rollers 100 and 102 stretch a fluid 106 that flows through the nip 104. The nip 104 is the space between the two rollers 100, 102 into which the fluid is drawn when the rollers 100, 102 counter-rotate. As shown in the exploded view of the diagram, the fluid 106 pools at an upstream side of the nip 104 and moves through the nip 104 as the rollers rotate.

On a downstream side 108 of the nip 104, the fluid stretches between the surfaces of the two rollers 100, 102 into a fluid filament 110. As the rollers 100, 102 counter-rotate, the surfaces of the rollers 100, 102 to which the fluid filament 110 adheres remains the same, but the space between such surface is greater. The fluid filament 112 grows longer and thinner as the surfaces of the rollers 100, 102 rotate away from each other. When the fluid filament 112 reaches a point of the liquid bridge it becomes unstable at this point, this is also the capillary break-up point for the fluid filament 112. The fluid filament 112 breaks up into several droplets 114 and leaves excess fluid 116 behind on each of the roller's surface. The excess fluid 116 retracts to the surface of its respective roller and can be part of the fluid that pools and moves through the nip on the next rotation of the rollers. The process can be repeated to provide a continuous mist.

To effect better spreading of high surface tension fluids, the surface of the rollers is geometrically inhomogeneous. These inhomogeneous patterns can consist of regular geometric shape patterns, some examples include but not limited to helical grooves, circular grooves, dimples of various shapes or cross hatch patterns. As the term is used here, a helical groove is one continuous groove that spirals around the roller. This is in contrast with a series of individual circular grooves, that are all self-contained circles.

It is manufactured typically by turning the roller while a tool of some kind presses into the roller and traverses it while it spins. There are several other manufacturing methods to fabricate inhomogeneous geometric patterns on roller surfaces which are all applicable to control the spreading of high surface tension fluids and tailoring the fluid filament size, thereby the mist characteristics. These methods include providing a cylindrical core of a hydrophilic material, covering the cylindrical core with a hydrophobic surface, and creating grooves in the hydrophobic surface to form a geometrically inhomogeneous pattern of the hydrophilic material.

Covering the cylindrical core with a hydrophobic surface may result from one of many processes. In one embodiment, including casting the hydrophobic material over the hydrophilic core, then hardening the hydrophobic material. In another embodiment, coating the hydrophobic surface comprises spray coating the hydrophilic core prior to creating the grooves. The process may also involve plasma treating the hydrophilic core and applying a silylating agent to the surface. In another embodiment, a polymer is bound to the surface through chemical linkage, which may be covalent, ionic, dative or through chelation, to form brushes or chains. This would allow selection of a monomer to achieve a desired balance between the hydrophobic and hydrophilic properties.

Forming the grooves may also be accomplished in one of several ways. These include turning the hydrophobic surface on a lathe, sand blasting the hydrophobic surface, and etching, either chemically or with a laser, the hydrophobic surface.

In an alternative embodiment, the process may occur in a reverse manner. A hydrophobic core is first machined, sand-blasted, or laser etched to a selected texture. The surface is functionalized to make it hydrophilic. The small fraction of the top layer, or ridges, is removed in order to expose the original hydrophobic surface, leaving the hydrophilic grooves untouched.

Figure 3:
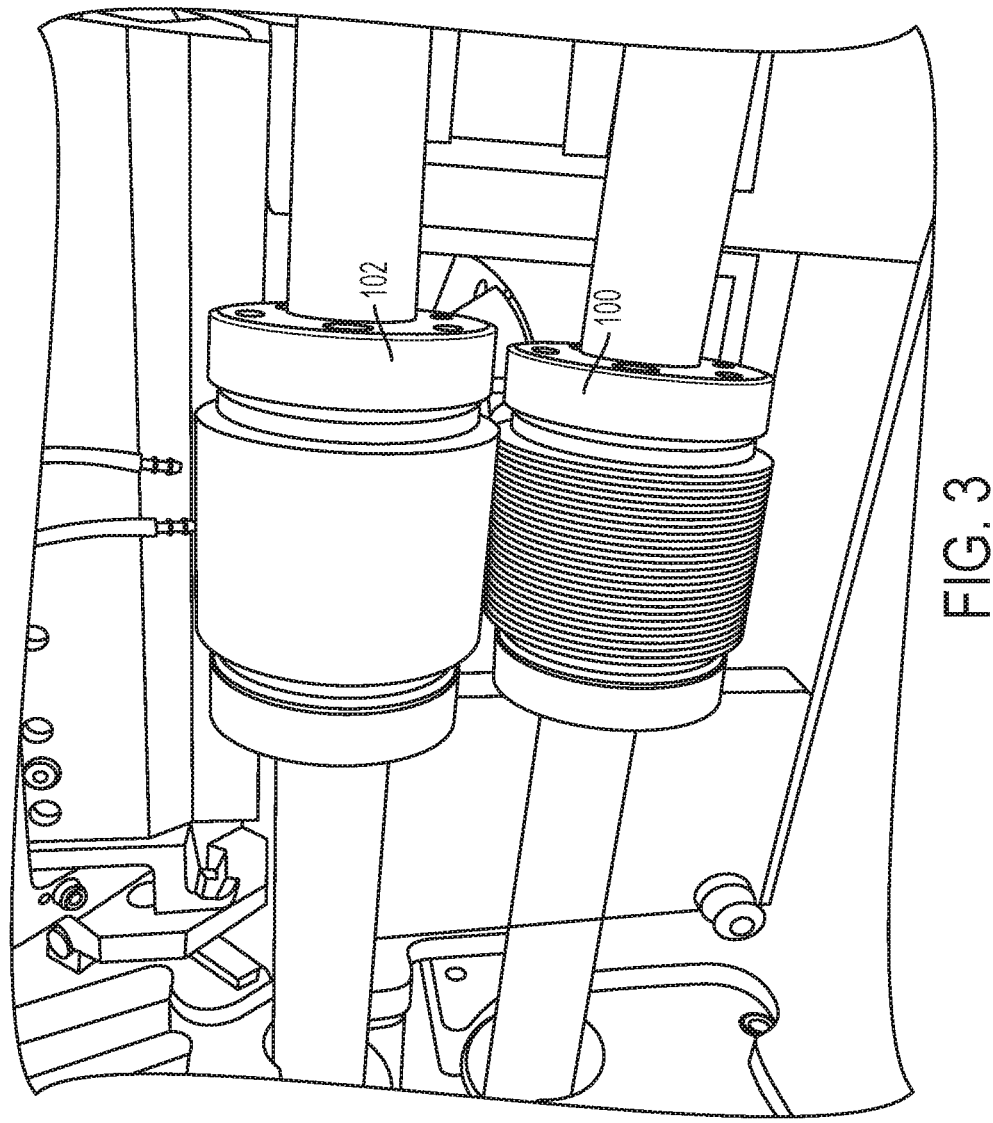

FIG. 3 shows an embodiment of two counter rotating rollers. The top roller 102 has a smooth surface and the bottom roller 100 has a patterned surface. In this embodiment, the pattern is a helical groove at 108 threads per inch (TPI). As the fluid is picked up by either roller, it spreads over the patterned roller in a more uniform layer, even with higher surface tension fluids. This allows for more reproducible filament and therefore droplet formation.

Figure 4:
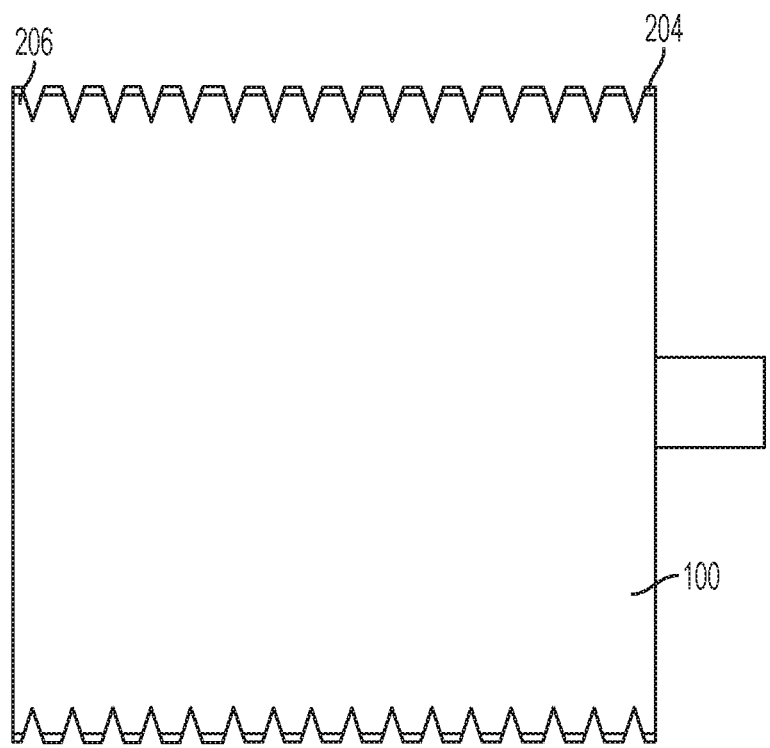

In one embodiment, the roller is formed by taking a hydrophilic core and covering it with a hydrophobic material. The hydrophobic material is then cut away by machining, leaving hydrophilic grooves surrounded by hydrophobic ridges. FIG. 4 shows an example of such a roller. The roller 100 has hydrophilic grooves such as 206 and hydrophobic ridges 204. One approach may involve a hydrophobic coating on the ridges to ensure retaining the high surface tension fluid in the grooves.

Figure 5:
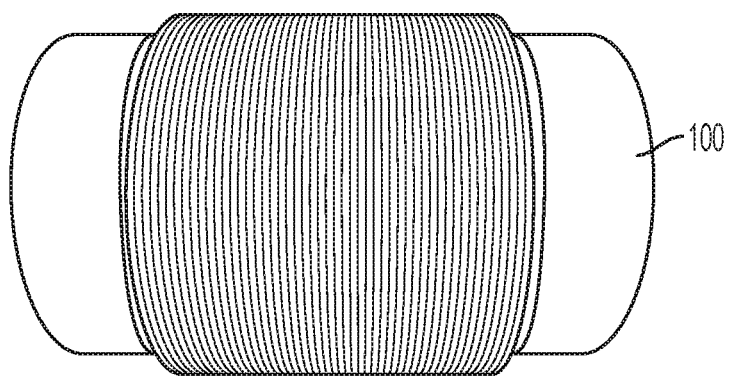
Figure 6:
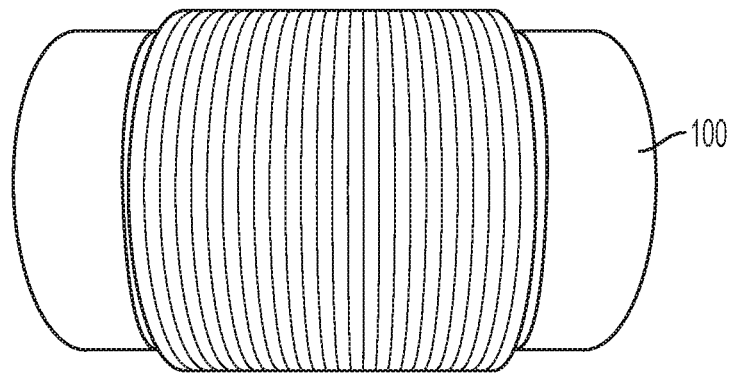
Figure 7:
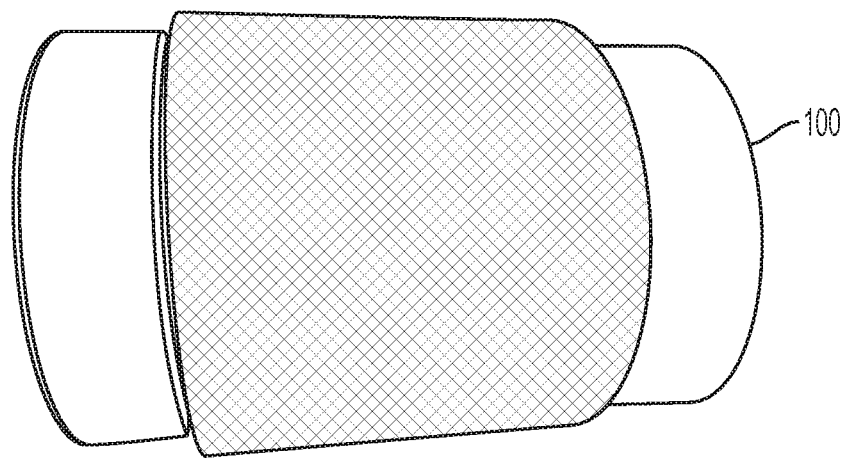

FIGS. 5-7 show different embodiments of the patterning on the surface of the roller. FIG. 5 shows a helically grooved roller having 108 TPI. FIG. 6 shows a roller having a helically grooved roller having 64 turns per inch. FIG. 7 shows a roller with a different pattern. In this embodiment, the surface of the roller has a cross hatching pattern.

Figure 8:
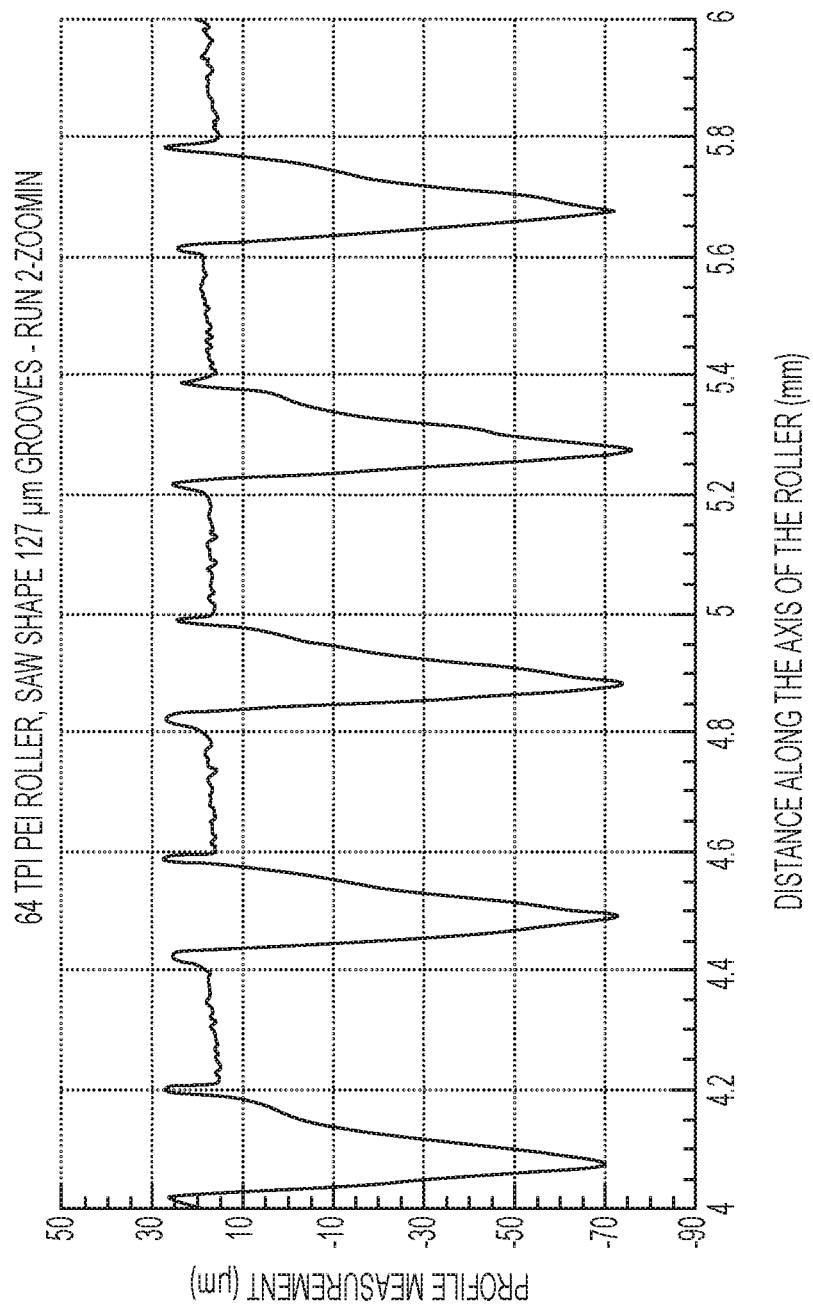
Figure 9:
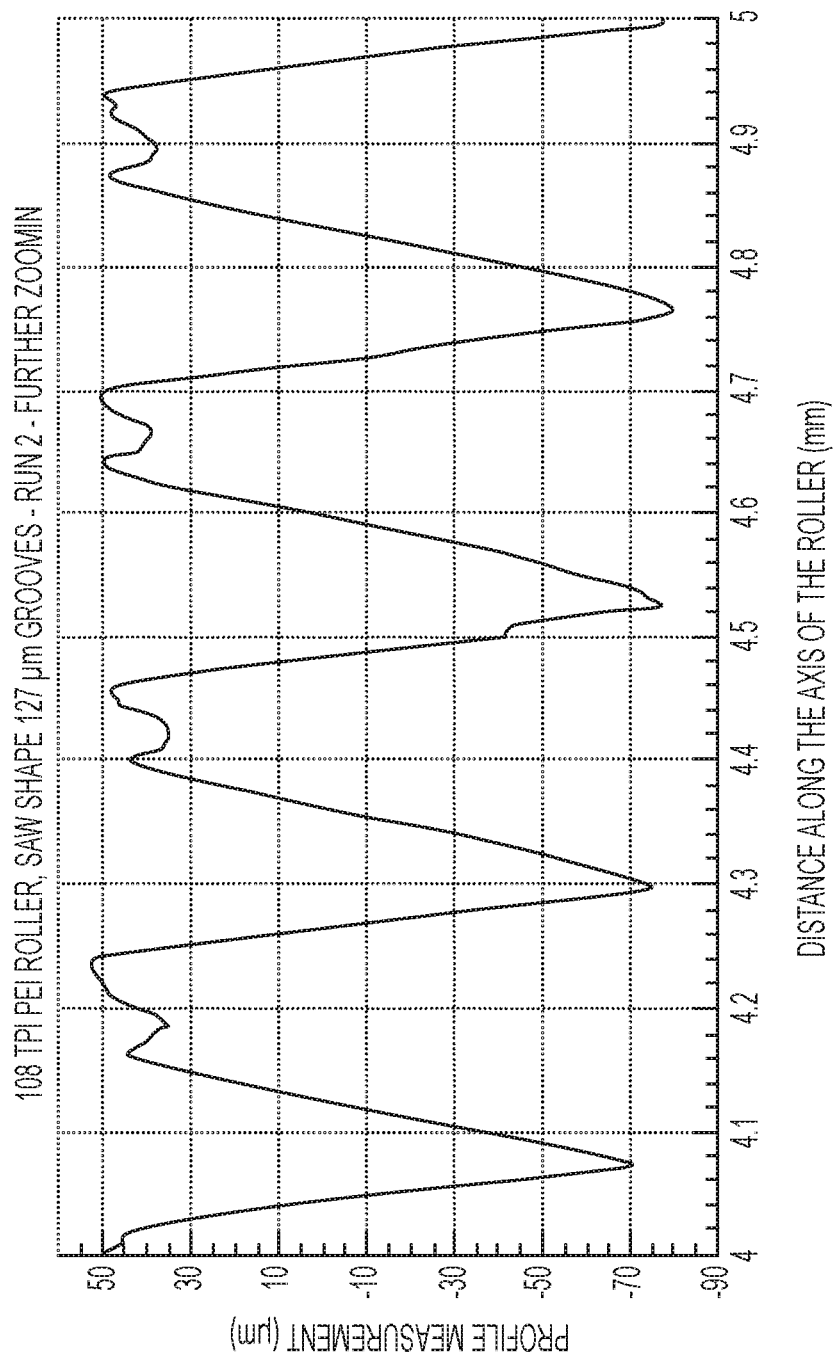

A helical groove has several different parameters, including the turn radius, the turns per inch of the helix, and the other dimensions of the groove, such the width and the depth. The embodiments here set out 108 TPI, 64 TPI, grooves of 127 micrometer width, and rollers with turn radii of 12.5 and 6.3 micrometers. These provide specific examples, and should not be construed to limit the applicability of the claims to other dimensions or parameters. FIGS. 8 and 9 show surface profiles for a 64 TPI roller and a 108 TPI roller. The roller has 127 micrometer wide grooves running the axis of the roller.

In this manner, higher surface tension fluids can be converted to a spray of droplets using a filament extension atomizer system. The grooved roller allows for better spreading of the fluid over one of a pair of counter rotating rollers. The control of the dimensions of the geometric inhomogeneous patterns, such as the depth and width of the grooves noted as examples above, can also provide better control over the size of the filaments, which in turn provides better control of the size of the droplets.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A roller, comprising:

a cylindrical outer surface of a hydrophobic material;

an inner core of a hydrophilic material within the outer surface; and a geometric pattern of grooves in the outer surface that expose portions of the inner core of the hydrophilic material to allow the portions to accept fluid.

2. The roller of claim 1, wherein the hydrophilic material comprises polyetherimide.

3. The roller of claim 1, wherein a size of ridges between the grooves is less than three times a size of the grooves.

4. The roller of claim 1, wherein the hydrophobic material comprises polytetrafluoroethylene.

5. The roller of claim 1, wherein the geometric pattern is a helical groove and has a turned finish having a radius based upon a filament size.

6. The roller of claim 1, wherein the grooves have dimensions that result in a capillary pressure of less than −100 Pascals for a selected liquid.

7. A method of manufacturing a roller, comprising:

providing a cylindrical core of a hydrophilic material;

covering the cylindrical core with a hydrophobic surface;

creating grooves in the hydrophobic surface to expose the hydrophilic material in a geometrical pattern to allow the grooves to accept fluid.

8. The method of claim 7, wherein covering the cylindrical core with a hydrophobic surface comprises inserting the hydrophilic core inside a hydrophobic cylindrical surface.

9. The method of claim 7, wherein covering the cylindrical core with a hydrophobic surface includes casting the hydrophobic material over the hydrophilic core, then hardening the hydrophobic material.

10. The method of claim 7, wherein creating the hydrophobic surface comprises spray coating the hydrophilic core with a hydrophobic material prior to creating grooves.

11. The method of claim 7, wherein creating grooves comprises one of turning the hydrophobic surface on a lathe, sand blasting the hydrophobic surface, laser ablation, and etching the surface.

12. The method of claim 7, wherein covering the cylindrical core with a hydrophobic surface comprises casting the hydrophobic surface over the cylindrical core.

13. The method of claim 7, wherein covering the cylindrical core with a hydrophobic surface comprises plasma treating the hydrophilic core and applying a silylating agent to the hydrophobic surface prior to creating the grooves.

14. The method of claim 7, wherein covering the cylindrical core with a hydrophobic surface comprises grafting polymer chains or brushes onto the hydrophobic surface prior to creating the grooves.

15. The method of claim 14, wherein grafting the polymer chains on the hydrophobic surface comprises selecting monomers to achieve a desired balance of hydrophobic and hydrophilic properties.

16. A method of manufacturing a roller, comprising:

forming a geometric pattern of grooves on a surface of a hydrophobic core;

making the surface of the hydrophobic core hydrophilic; and removing a portion of the surface of the hydrophobic core to expose the hydrophobic core, leaving hydrophilic grooves to allow the hydrophilic grooves to accept fluid.

17. The method of 16, wherein forming the pattern of grooves comprises one of machining, sand blasting, chemically etching or laser etching the hydrophobic core.

* * * * *